United States Patent
Mizuno et al.

(10) Patent No.: US 8,755,035 B2
(45) Date of Patent: Jun. 17, 2014

(54) LIGHT SCANNING DEVICE, LASER RADAR DEVICE, AND LIGHT SCANNING METHOD

(75) Inventors: Tamotsu Mizuno, Aichi-ken (JP); Hiroyuki Matsubara, Seto (JP)

(73) Assignee: DENSO CORPORATION, Kariya (JP)

( * ) Notice: Subject to any disclaimer, the term of this patent is extended or adjusted under 35 U.S.C. 154(b) by 761 days.

(21) Appl. No.: 12/926,571

(22) Filed: Nov. 24, 2010

(65) Prior Publication Data

US 2011/0128525 A1 Jun. 2, 2011

(30) Foreign Application Priority Data

Nov. 30, 2009 (JP) ................................. 2009-272381

(51) Int. Cl.
*G01C 3/08* (2006.01)
*G02B 26/10* (2006.01)

(52) U.S. Cl.
USPC ...................................... 356/4.01; 359/212.2

(58) Field of Classification Search
USPC ...................................... 356/4.01; 359/212.2
See application file for complete search history.

(56) References Cited

U.S. PATENT DOCUMENTS

| | | | |
|---|---|---|---|
| 5,223,956 A * | 6/1993 | Kramer et al. | ................... 359/17 |
| 5,703,718 A | 12/1997 | Ohtomo et al. | |
| 5,909,311 A * | 6/1999 | Ohtomo et al. | .......... 359/489.07 |
| 7,499,638 B2 | 3/2009 | Arai et al. | |
| 8,000,181 B2 * | 8/2011 | Yamada | ...................... 369/44.11 |
| 2002/0088927 A1 * | 7/2002 | Simchoni | ...................... 250/225 |

FOREIGN PATENT DOCUMENTS

| | | |
|---|---|---|
| JP | H06-82549 A | 3/1994 |
| JP | H07-012569 | 1/1995 |
| JP | H09-021872 | 1/1997 |
| JP | 2005-077130 A | 3/2005 |
| JP | 2007-170917 A | 7/2007 |

OTHER PUBLICATIONS

Office Action mailed May 7, 2013 in the corresponding JP application No. 2009-272381 (English translation).

* cited by examiner

*Primary Examiner* — Isam Alsomiri
*Assistant Examiner* — Vicente Rodriguez
(74) *Attorney, Agent, or Firm* — Posz Law Group, PLC

(57) ABSTRACT

An on-vehicle laser radar device scans laser light in front and side zones through the windshield glass of a vehicle in a horizontal direction in order to detect an obstacle. When projecting the laser light emitted from the light source to the windshield glass, the device rotates a polarization plane of the laser light according to the angle of inclination of the windshield glass and an azimuth angle in the horizontal direction, and outputs the polarized laser light through the windshield glass in order to scan the laser light toward front and side visual zones of the vehicle.

14 Claims, 11 Drawing Sheets

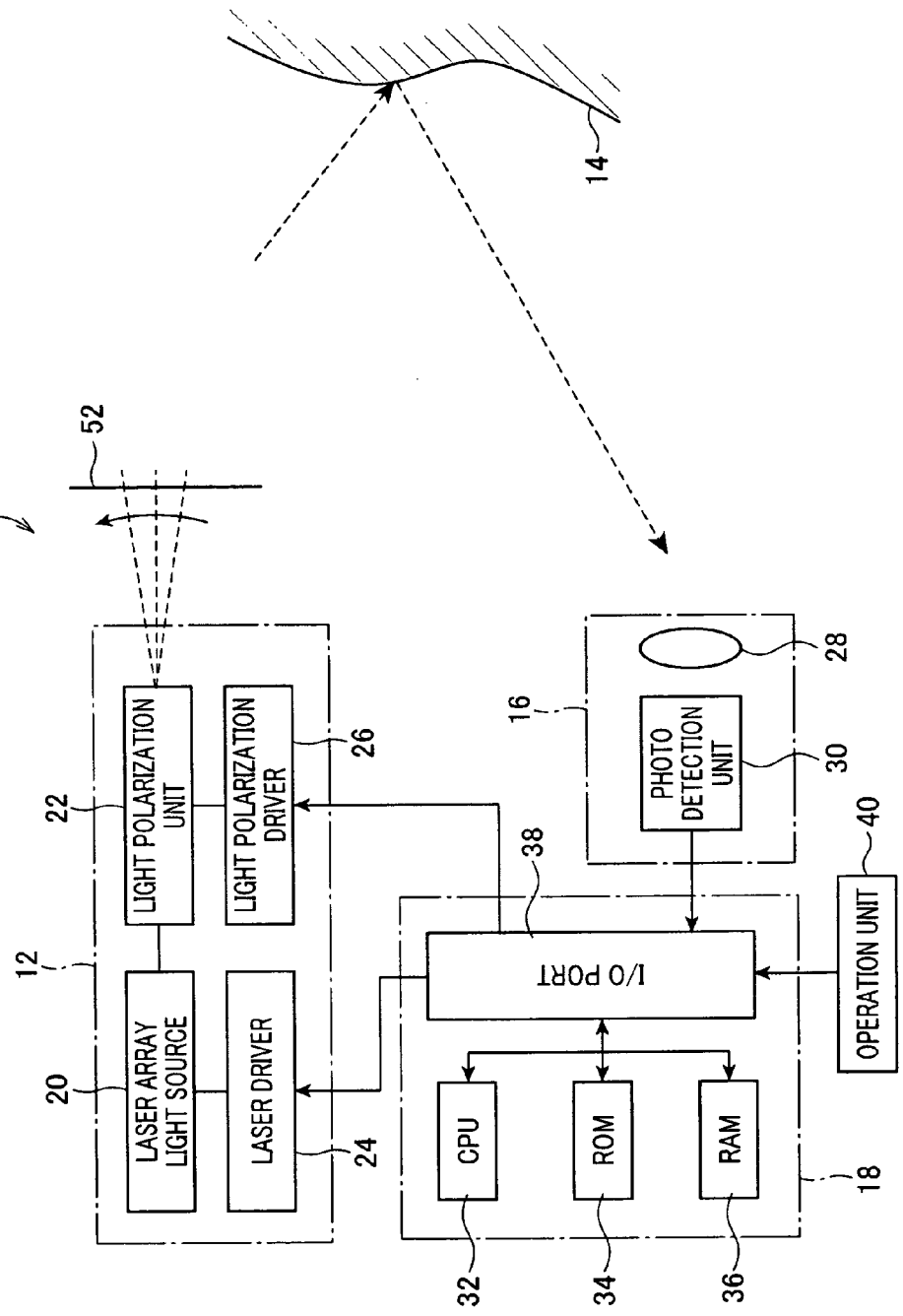

LIGHT SCANNING DEVICE, LASER RADAR DEVICE, AND LIGHT SCANNING METHOD

CROSS-REFERENCE TO RELATED APPLICATION

This application is related to and claims priority from Japanese Patent Application No. 2009-272381 filed on Nov. 30, 2009, the contents of which are hereby incorporated by reference.

BACKGROUND OF THE INVENTION

1. Field of the Invention

The present invention relates to light scanning devices, laser radar devices, and light scanning methods.

2. Description of the Related Art

There is a conventional laser radar device capable of monitoring a wide-angle visual zone in the front forward visual zone and side visual zone of the device. Such a laser radar device is mounted in general on a vehicle and transmits laser light toward the front forward visual zone and side visual zone of the vehicle in order to detect obstacles which are present in the front visual zone and size visual zone of the vehicle, and to detect the distance between the laser radar device (namely, the vehicle) and the target front obstacle.

The laser radar device is generally comprised of a light output unit and a light detection unit. The light output unit generates and transmits laser light. The light detection unit receives and detects the laser light reflected by the obstacles. It is necessary for the light output unit of the laser radar device to scan the wide-angle visual zone with a high resolution without generating any dead visual zone.

Such a type of the conventional light scanning device generally aligns polarized laser light and emits the aligned laser light to the scanning visual zone in order to uniformly scan the laser light to all directions in the scanning angle. Conventional patent documents, for example, Japanese patent laid open publications No. JP H09-021872, and No. JP H07-12569, have disclosed the conventional laser radar device.

The conventional scan-type distance detection device which is disclosed, for example, in JP H09-021872 has an improved function which expands the detection angle (or range) of the scanning visual zone, to which the laser light is scanned, without decreasing the resolution in the rotating direction of a scanning mirror by preventing the projection image in the entire scanning angle (or range) from being rotated and by rotating an image rotating prism which is linked together with the scanning mirror.

The conventional detection device disclosed in JP H07-12569 is capable of detecting a target object on the basis of the laser light which is reflected by the target object. This conventional detection device scans the laser light to the target detection zone. The laser light is polarized light which is limited in polarized direction in order to eliminate strong reflections from the laser light reflected by glossily flat surfaces.

However, when the scanned laser light has the same polarized direction in each of directions in the entire scanning angle in the wide-angle visual zone of the laser radar device mounted on a vehicle, the laser light reflected from both sides of the wide-angle visual zone has a decreased strength (or sensitivity). This would cause various problems.

SUMMARY OF THE INVENTION

It is an object of the present invention to provide a light scanning device, a laser radar device, and a light scanning method capable of detecting any point in a wide-angle visual zone to which laser light is scanned without decreasing and with keeping its sensitivity of each point in the wide-angle visual zone.

To achieve the above purpose, the present invention provides a light scanning device which is comprised of a transparent plate and a light output unit. The transparent plate is extending across a horizontal direction with a predetermined angle of inclination in the light scanning device. The light output unit is equipped with a light source and a light polarization unit. The light source generates and emits laser light. The light polarization unit polarizes the laser light emitted from the light source. The light output unit instructs the light polarization unit to rotate the polarization plane of the laser light on the basis of the predetermined angle of inclination of the transparent plate and an azimuth angle in the horizontal direction. This azimuth angle in the horizontal direction is the angle obtained between an azimuth of the laser light in the horizontal direction and a reference azimuth of the transparent plate.

The light output device then transmits the rotated laser light to the transparent plate in order to scan the rotated laser light to the outside of the laser scanning device through the transparent plate.

In the light scanning device according to the present invention, the polarization plane of the scanning beam of laser light is rotated by an angle $\delta$ so that the polarization plane of the scanning beam of laser light is approximately equal to the p polarization plane of the scanning beam of laser light. That is, the light output unit in the light scanning device controls so that the rotary angle $\delta$ of the polarization plane of the scanning beam of laser light in the scanning azimuth is approximately equal to the rotary angle $\gamma$ of the p polarization plane. It is possible for the above control, which rotates the polarization plane of the scanning beam of laser light by the angle $\delta$ according to the rotary angle $\gamma$ of the p polarization plane in the scanning azimuth, to decrease the reflection rate of the scanning beam of laser light through the surface of the transparent plate in the scanning azimuth. It is further possible to increase the transmission rate of the scanning beam of laser light on the transparent plate.

That is, according to the light scanning device of the present invention, the rotary angle $\gamma$ of the p polarization plane of the scanning beam of laser light is changed on the basis of the angle $\theta$ of inclination of the transparent plate. Further, the polarization plane of the scanning beam of laser light is rotated by the angle $\delta$ on the basis of the rotary angle $\gamma$ of the p polarization plane which is determined by the angle $\theta$ of inclination and the azimuth angle $\alpha$ of the transparent plate. This makes it possible to increase the transmission rate of the scanning beam of laser light against the transparent plate with the angle $\theta$ of inclination and the azimuth angle $\alpha$.

In accordance with another aspect of the present invention, there is provided a laser radar device for scanning laser light. The laser radar device has a windshield glass, a light output unit, and a light detection unit. The windshield glass is extending across a horizontal direction with a predetermined angle of inclination against the horizontal direction. The light output unit is equipped with a light source for emitting laser light and a light polarization unit. The light polarization unit polarizes the laser light. The light output unit outputs the laser light in the horizontal direction, and instructs the light polarization unit to rotate the polarization plane of the laser light emitted by the light source according to the angle of inclination of the windshield glass and an azimuth angle in the horizontal direction. This azimuth angle in the horizontal direction is the angle obtained between an azimuth of the laser light in the horizontal direction and a reference azimuth of the transparent plate. The light output unit then outputs the polarized laser light to the windshield glass in order to scan the laser light toward the outside of the laser radar device in a wide-angle scanning visual zone. The light detection unit receives and detects the laser light reflected by an obstacle placed in the wide-angle scanning visual zone.

In accordance with another aspect of the present invention, there is provided a laser radar device for scanning laser light. The laser radar device has a windshield glass, a light output unit, and a light detection unit. The windshield glass is extending across a horizontal direction with a predetermined angle of inclination to a horizontal direction. The light output unit is equipped with a light source for emitting laser light and a light polarization unit. The light output unit scans the laser light emitted by the light source in the horizontal direction and instructs the light polarization unit to rotate the polarization plane of the laser light emitted from the light source on the basis of the angle of inclination of the windshield glass and the azimuth angle in the horizontal direction, where the azimuth angle in the horizontal direction is an angle obtained between an azimuth of the laser light in the horizontal direction and a reference azimuth of the transparent plate, and the light output unit outputting the polarized laser light to the windshield glass. The light detection unit detects the laser light which is output from the light output unit through the transparent plate, and then reflected by an obstacle placed at a side zone or in a front zone.

In the laser radar device according to the present invention, the polarization plane of the scanning beam of laser light is rotated by the angle δ so that the polarization plane of the scanning beam of laser light is approximately equal to the p polarization plane of the scanning beam of laser light. That is, the light output unit controls so that the rotary angle δ of the polarization plane of the scanning beam of laser light in the scanning azimuth is approximately equal to the rotary angle γ of the p polarization plane. It is thereby possible for the above control, which rotates the polarization plane of the scanning beam of laser light by the angle δ according to the rotary angle γ of the p polarization plane in the scanning azimuth, to decrease the reflection rate of the scanning beam of laser light on the surface of the windshield glass in the scanning azimuth. It is further possible to increase the transmission rate of the scanning beam of laser light on the windshield glass.

In the laser radar device according to the present invention, the rotary angle γ of the p polarization plane of the scanning beam of laser light is changed on the basis of the angle θ of inclination of the windshield glass. Further, the polarization plane of the scanning beam of laser light is rotated by the angle δ on the basis of the rotary angle γ of the p polarization plane which is determined by the angle θ of inclination and the azimuth angle α of the windshield glass. This makes it possible to increase the transmission rate of the scanning beam of laser light against the windshield glass with angle θ of inclination and the azimuth angle α.

In accordance with another aspect of the present invention, there is provided a method of scanning laser light produced by a light source through a transparent plate which is placed with a predetermined angle of inclination to a horizontal direction. The method has steps of (a), (b), (c) and (d): (a) scanning laser light emitted from a light source; (b) rotating a polarization plane of the laser light on the basis of the angle of inclination of the transparent plate and an azimuth angle in the horizontal direction, where the azimuth angle in the horizontal direction is an angle obtained between an azimuth of the laser light in the horizontal direction and a reference azimuth of the transparent plate; (c) outputting the polarized laser light to the transparent plate; and (d) scanning the polarized laser light through the transparent plate.

The method according to the present invention also has the same effects of the light scanning device and the laser radar device according to the present invention, previously described.

It is possible to adequately apply the concept of the present invention to various types of light scanning devices and laser radar devices for scanning laser light through a transparent plate (or a windshield glass) which is placed with a predetermined angle of inclination to the horizontal direction.

For example, the on-vehicle laser radar device according to the present invention can be applied to aircrafts, trains, ships, etc. It is also possible to place the on-vehicle laser radar device according to the present invention to the device which is fixed to the ground and does not move. In particular, the on-vehicle laser radar device according to the present invention can be preferably applied to the case where a transparent plate (or a windshield glass) is placed with a predetermined angle of inclination within the angle (or range) of not less than 20° and not more than 45°. This makes it possible to efficiently prevent the sensitivity from decreasing.

BRIEF DESCRIPTION OF THE DRAWINGS

A preferred, non-limiting embodiment of the present invention will be described by way of example with reference to the accompanying drawings, in which:

FIG. 1 is a schematic view showing a structure of an on-vehicle laser radar device according to an embodiment of the present invention;

DETAILED DESCRIPTION OF THE PREFERRED EMBODIMENT

Figure 3A:
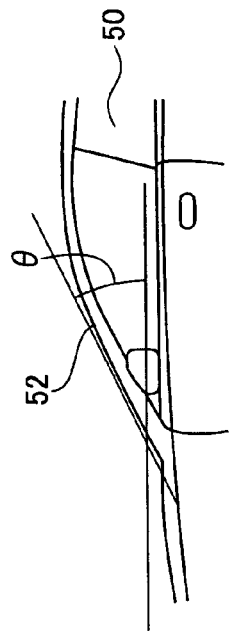
FIG. 3A is a side view showing an angle θ of inclination of the windshield glass of a vehicle.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of an on-vehicle laser radar device according to an embodiment with reference to FIG. 1 to FIG. 12. The concept of the light scanning device, the laser radar device, and the method of scanning laser light according to the present invention is applied to the on-vehicle laser radar device according to the embodiment.

<Schematic Structure of the On-Vehicle Laser Radar Device>

FIG. 1 is a schematic view showing a structure of the on-vehicle laser radar device 10 according to the embodiment of the present invention.

As shown in FIG. 1, the on-vehicle laser radar device 10 is comprised of a light output unit 12, a light detection unit 16, and a control unit 18.

The light output unit 12 generates and outputs laser light (or laser beam) toward a monitor zone. The light detection unit 16 receives the laser light reflected by an obstacle 14 which is present in the monitor zone. The control unit 18 controls the units which form the laser radar device 10.

The light output unit 12 is equipped with a laser array light source 20 which emits laser light, and a light polarization unit 22 which receives the laser light emitted from the laser array light source 20 and polarizes the received laser light. The light polarization unit 22 is equipped with a movable mirror (omitted from drawings) capable of changing the optical path of incident light by reflecting the incident light. A detailed structure of the light polarization unit 22 will be explained later.

The laser array light source 20 is connected to the laser driver 24. The light polarization unit 22 is connected to a light polarization driver 26. The light detection unit 16 is composed mainly of a condensing lens 28 and a light detection unit 30.

The control unit 18 has a central processing unit (CPU) 32, a read only memory (ROM) 34, a random access memory (RAM) 36, and an input/output port 38 (I/O port) 38. The CPU 32 controls the entire units of the on-vehicle laser radar device 10. The ROM 34 stores various types of programs such as an operating system (OS) and monitoring programs. The RAM 36 is used as a working area during the execution of the programs read from the ROM 34. The CPU 32, the ROM 34, the RAM 36, and the I/O port 38 are electrically connected with each other through buses.

Various types of monitoring programs are stored in the ROM 34 placed in the on-vehicle laser radar device 10 according to the embodiment. The laser radar device 10 monitors a front visual zone and side visual zones of the vehicle by performing the monitoring programs. The control unit 18 serves as the distance device (or range finder as analysis device) to calculate a distance between the target obstacle 14 (see FIG. 1) and the on-vehicle laser radar device 10 on the basis of the delay time of pulse laser light reflected by the target obstacle 14.

The I/O port 38 is electrically connected to each of the laser driver 24, the light polarization driver 26, and the light detection unit 30. The I/O port 38 is further electrically connected to an operation unit 40 with which the operator operates the on-vehicle laser radar device 10 according to the embodiment.

It is acceptable for the control unit 18 to have various types of driver units such as a hard disk drive in order to input various types of data information. It is also possible to connect a small-sized display unit, etc. to the I/O port 38.

Next, a description will now be given of the operation of the on-vehicle laser radar device 10 according to the embodiment.

When the operator inputs the instruction to start the operation of the on-vehicle laser radar device 10 through the operation unit 40, the on-vehicle laser radar device 10 starts to monitor the visual zone around the vehicle such as the front visual zone and the side visual zones such as Left side visual zone and Right side visual zone of the vehicle.

The CPU 32 reads the monitoring programs stored in the ROM 34. The monitoring program is thereby loaded to the RAM 36. The CPU 32 uses the RAM 36 as working area, and executes the monitoring program.

First, the control unit 18 transfers a control signal to the laser driver 24 in order to drive the laser array light source 20 in the light output unit 12.

The laser driver 24 generates a drive signal on the basis of the received control signal. The laser array light source 20 performs pulse-modulation of laser light based on the received drive signal, and outputs pulse-modulated laser light. For example, the laser array light source 20 is controlled by the received drive signal in order to output the laser light having a pulse with of approximate 10 nanometer second (10 ns). The laser array light source 20 outputs the pulse-modulated laser light having a predetermined strength. (Hereinafter, will be referred to as the "laser light").

The laser light has a predetermined strength on the basis of the distance between the on-vehicle laser radar device 10 and a target scanning surface. The target scanning surface indicates the irradiation surface of the laser light which is virtually set at the outermost part in the monitor zone.

The control unit 18 transfers the control signal to the light polarization driver 26 in order to drive the light polarization driver 26. When receiving the control signal transferred from the control unit 18 through the I/O port 38, the light polarization driver 26 generates the drive signal on the basis of the received control signal. The light polarization unit 22 is then driven by the drive signal transferred from the light polarization driver 26. That is, the movable mirror (omitted from FIG. 1) in the light polarization unit 22 is rotated around a predetermined axis, and reflects the incident laser light emitted from the laser array light source 20.

The light polarization unit 22 polarizes the laser light output from the laser array light source 20, and irradiates the polarized laser light toward the target scanning zone through the windshield glass 52. The laser light is irradiated to the target obstacle 14 which is present in the monitor zone (visual zone). The laser light reflected by the target obstacle 14 is condensed by the condensing lens 28. The light detection unit 30 detects the reflected laser light, converts it to a detection signal, and amplifies the detection signal. The light detection unit 30 in the light detection unit 16 outputs the amplified detection signal to the control unit 18.

The control unit 18 calculates the distance L(m) between the on-vehicle laser device 10 and the target obstacle 14 on the basis of the equation $\tau=2L/c$, where $\tau$ (sec.) is a delay time of a reflected laser light in pulse, and c is the velocity of light ($3.0 \times 10^8$ m/sec.), The delay time $\tau$ is the time counted from the time when the laser array light source 20 emits the laser light in pulse to the time when the light detection unit 30 detects the reflected laser light in pulse. The calculated distance L(m) to the target obstacle 14 is displayed on a display unit (not shown) according to demands.

In the on-vehicle laser device 10, the transparent plate corresponds to the windshield glass 52 which is placed at an angle on the front part of the driver's seat of the vehicle.

Accordingly, the light scanning device according to the present invention comprises a combination of the windshield glass 52 and the light output unit 12 composed mainly of the laser array light source 20 and the light polarization unit 22.

The on-vehicle laser device 10 uses a direction which is parallel to the surface of the road on which the vehicle drives, and uses a vertical direction which is a direction perpendicular to the surface of the road. The on-vehicle laser radar device 10 usually uses an infrared laser light source of wavelength not less than 870 nm.

<Reason for Decreasing Sensitivity>

Next, a description will now be given of the reason for decreasing the sensitivity of the on-vehicle laser device 10.

Figure 2:
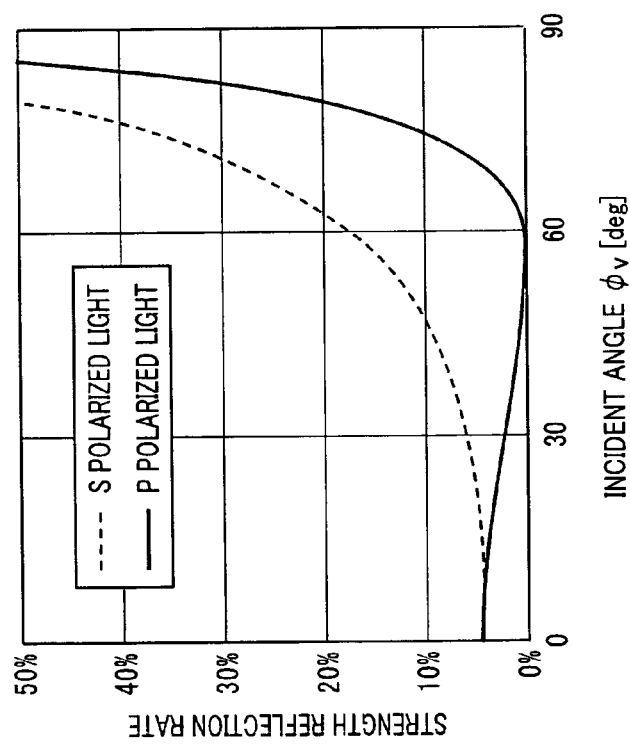
FIG. 2 is a graph showing a relationship in reflection rate between the p polarized laser light and the s polarized laser light to an incident angle φv of laser light which strikes the surface of a transparent plate.

FIG. 2 is a graph showing a relationship in reflection rate between the p polarized light and the s polarized light to an incident angle φv of laser light which strikes the surface of a transparent plate. In FIG. 2, the horizontal axis is the incident angle φv of an incident laser light (° vertical component) to the surface of the windshield glass, and the vertical axis indicates the reflection rate (%) in strength of the laser light.

Reflection rate in strength (%)=Reflected laser light in strength/incident laser light in strength×100.

In FIG. 2, the solid line indicates the p polarized laser light (p wave) and the dotted line indicates the s polarized laser light (s wave).

The p polarized laser light is a polarized laser light whose plane of polarization (or whose direction in vibration) is within a first plane which is sectioned by the incident laser light and the normal line. On the other hand, the s polarized laser light is a polarized laser light whose plane of polarization (or whose direction in vibration) is within a second plane which is perpendicular to the first plane. Hereinafter, the plane which includes the incident laser light and the normal line will be called as the "incident plane".

As shown in FIG. 2, when the laser light is input on the surface of the transparent plate which is made of dielectric substance, the reflection rate of the incident laser light is changed on the basis of the incident angle φv on the surface of the transparent plate.

The reflection rate on the surface of the transparent plate is different in p polarization and s polarization on the basis of Fresnel's law.

The transparent plate is made of glass plate (refractive index n=1.52). When the laser light is irradiated on the surface of the glass plate, the reflection rate of s polarized value is simply increased on the basis of increasing the incident angle φv. On the other hand, the reflection rate of p polarized value is decreased on the basis of increasing the incident angle φv, and the reflection rate of p polarized value becomes zero at the incident angle φv=57°. Further, the reflection rate of s polarized value is increased on the basis of increasing the incident angle φv of more than 57° (φv>57°).

Figure 3B:
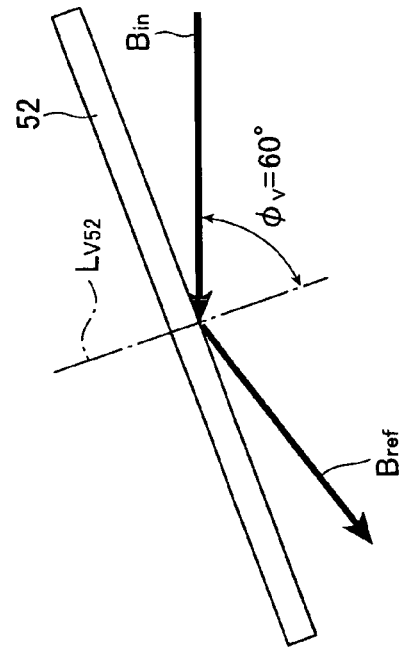
FIG. 3B is a view showing an incident angle φv of laser light (incident light) to the windshield glass, which is emitted from the on-vehicle laser radar device.

FIG. 3A is a side view showing an angle θ of inclination of the windshield glass 52 of the vehicle 50. FIG. 3B is a view showing an incident angle φv of laser light (incident light) to the windshield glass 52, which is emitted from the on-vehicle laser radar device 10.

As shown in FIG. 3A, the windshield glass 52 is placed on the vehicle 50 with the angle of inclination of approximately 30° against the road surface (horizontal direction) on which the vehicle 50 drives.

Accordingly, as shown in FIG. 3B, the incident angle φv of the incident laser light Bin on the windshield glass 52 of the vehicle 50 is approximately 60° when the on-vehicle laser radar device 10 scans the laser light in the direction which is parallel to the road surface of the road on which the vehicle 50 drives.

The incident angle φv of the incident laser light is the angle between the incident laser light Bin and the normal line Lv52 of the windshield glass 52. It can be understood to drastically change the reflection rate of the incident laser light Bin according to the polarized state of the incident laser light Bin when the incident angle φv of the incident laser light is approximately 60°.

That is, when the s polarized component of the incident laser light Bin is increased, the s polarized component of the incident laser light Bin is reflected on the inside surface and the outside surface of the windshield glass 52, and the total component of the laser light which penetrates the windshield glass 52 is decreased. Similarly, the s polarized component of the laser light reflected by the target obstacle 14 is also reflected on the inside surface and the outside surface of the windshield glass 52, and the amount of the reflected laser light which penetrates the windshield glass 52 is decreased.

As described above in detail, the more the s polarized component of the laser light is increased at the incident angle φv of approximately 60°, the more the reflection rate of the incident laser light is increased. This decreases the strength (or sensitivity) of the laser light detected by the light detection unit 16 shown in FIG. 1.

<Azimuth of Scanning and Rotation of p Polarization Place>

Next, a description will now be given of the azimuth of scanning in horizontal direction and the rotation of p polarization plane in the on-vehicle laser radar device 10 according to the embodiment.

Figure 4A:
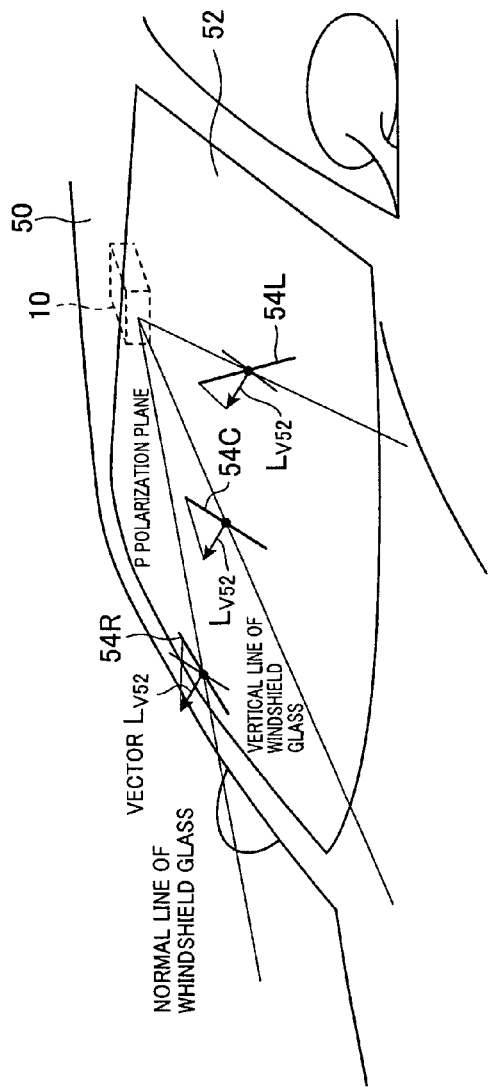
FIG. 4A is a perspective view showing scanned laser light in a horizontal direction emitted by the on-vehicle laser radar device of the embodiment mounted on the windshield glass made of laminated safety glass.
Figure 4B:
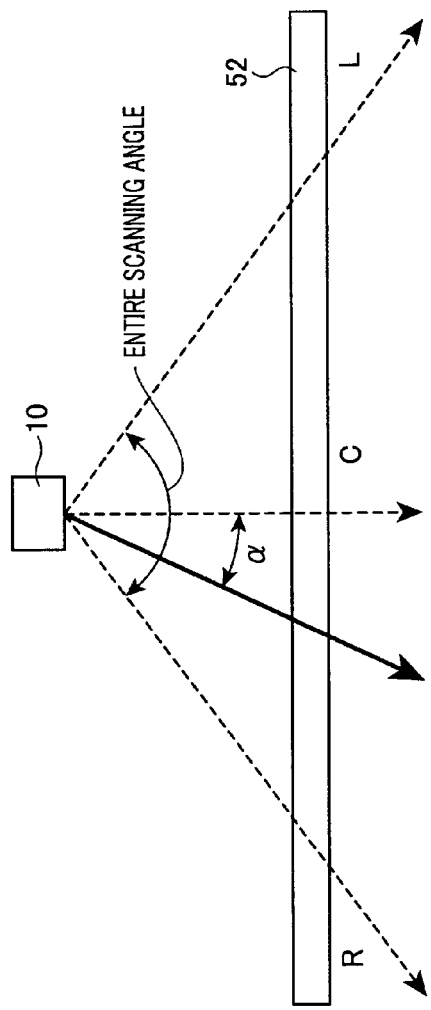
FIG. 4B is an explanatory plan view to define the azimuth of the scanned laser light emitted from the on-vehicle laser radar device toward a specified direction in the horizontal direction.

FIG. 4A is a perspective view showing scanned laser light in a horizontal direction emitted by the on-vehicle laser radar device 10 mounted on the windshield glass 52 made of laminated safety glass. FIG. 4B is an explanatory plan view to define the azimuth of the scanned laser light emitted from the on-vehicle laser radar device 10 toward a specified direction in the horizontal direction.

As shown in FIG. 4A, the windshield glass 52 of the vehicle 50 is placed inclined to the horizontal direction with the angle of approximate 30°. Similar to vehicles, aircrafts, trains, ships, etc., have the inclined windshields in order to decrease drag (or called as the "air resistance") during moving. The on-vehicle laser radar device 10 is generally placed at the central part in the width direction of the vehicle 50 and in the compartment of the vehicle 50.

Next, a description will now be given of the case where the on-vehicle laser radar device 10 scans the laser light toward the front zone of the vehicle through the windshield glass 52.

When the on-vehicle laser radar device 10 emits the laser light toward the front zone of the vehicle 50, the p polarization plane of the laser light, which is incident on the surface of the windshield glass 52, becomes parallel to the vertical direction which is perpendicular to the surface of the road on which the vehicle runs.

On the other hand, when the on-vehicle laser radar device 10 emits the laser light diagonally toward the front zone of the vehicle 50, the incident surface of the laser light to the windshield glass 52 is rotated, so that the p polarization plane of the laser light is not parallel to the vertical direction.

As shown in FIG. 4B, the on-vehicle laser radar device 10 which is placed at the central part in the width direction of the compartment of the vehicle 50 scans laser light toward the front zone in the horizontal direction through the windshield glass 52. It is possible to fix the entire scanning angle of the laser light in the horizontal direction at approximately 90° (±45°), for example. The front forward direction (C direction) of the vehicle 50 is used as a standard azimuth. The azimuth angle of the laser light which is emitted toward the C direction becomes zero (0°) on the basis of the standard azimuth. The laser light, which is emitted toward an inclined front direction (R direction) and an inclined front direction (L direction), has the azimuth angle $\alpha$.

In FIG. 4B, the slid line indicates the scanning laser beam (laser light), and dotted lines represent the C direction, the side part of the R direction, and the side part of the L direction. That is, the azimuth angle $\alpha$ is made by the azimuth in the horizontal direction of the laser beam and the reference azimuth (C direction).

It is possible for each of the azimuth in the R direction and the azimuth in the L direction to have a positive value. It is also possible for one of them to have a positive value (for example, +10°), and for the other to have a negative value (for example, −10°).

A description will now be given of the rotation of the p polarization plane on the basis of the azimuth angle $\alpha$ of the scanning beam of laser light.

Figure 5A:
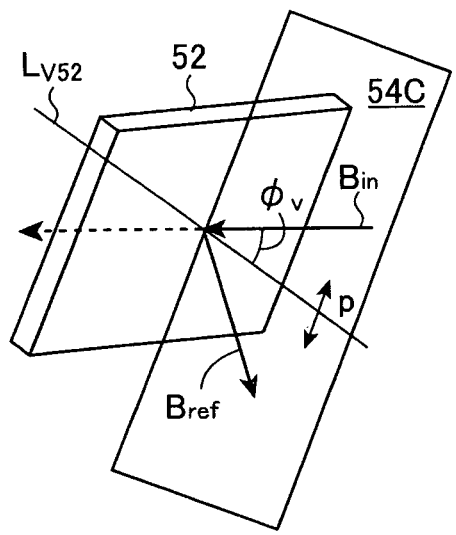
FIG. 5A, FIG. 5B, and FIG. 5C, each of which explanatory shows the case where the p polarization plane of the laser beam (laser light) becomes parallel to the vertical direction on the windshield glass of the vehicle when the azimuth angle α of the scanning beam is zero (α=0)
Figure 5B:
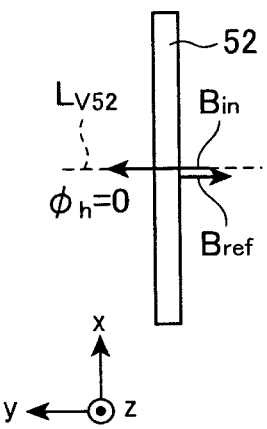
Figure 5C:
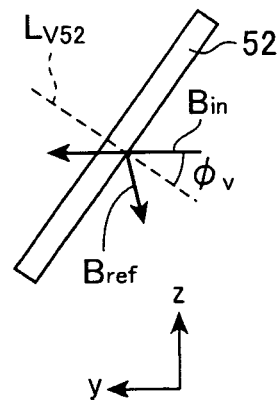

FIG. 5A, FIG. 5B, and FIG. 5C are explanatory views, each of which shows the case where the p polarization plane of the laser beam (laser light) becomes parallel to the vertical direction on the windshield glass 52 of the vehicle 50 when the azimuth angle $\alpha$ of the scanning beam of laser light is zero ($\alpha$=0). In particular, FIG. 5A is a perspective view of the scanning beam of laser light observed from the inside of the compartment of the vehicle 50. FIG. 5B is a plan view of the scanning beam of laser light observed from the upper side (the roof) of the vehicle 50. FIG. 5C is a side view of the scanning beam of laser light observed from the side of the vehicle 50.

In FIG. 5A, FIG. 5B, and FIG. 5C, the x direction is the horizontal direction and the width direction of the vehicle 50, the y direction is the direction of travel of the vehicle 50, the z direction is the vertical direction which is perpendicular to the horizontal direction, namely, the surface of the road on which the vehicle 50 travels.

The x direction, the y direction, and the z direction make a rectangular coordinate system, an orthogonal coordinate system, which are perpendicular with each other.

As shown in FIG. 4B, when the azimuth angle $\alpha$ of the scanning beam of laser light is zero ($\alpha$=0°), the on-vehicle laser radar device 10 emits the laser light in the C direction at the front forward direction of the vehicle 50. That is, as shown in FIG. 5B, the incident laser light Bin, the reflected laser light Bref, and the normal line Lv52 of the windshield glass 52 are on the same line in the horizontal line, and the incident angle $\phi h$ (horizontal component) of the incident laser light is zero ($\phi h$=0)

Accordingly, as shown by the solid arrow in FIG. 5A, the polarization direction (or vibration direction) of the p polarized laser light is present within the incident plane 52C which is made by the incident laser light Bin and the normal line Lv52. That is, the p polarization plane (incident surface 54C) becomes parallel to the vertical direction.

Figure 6A:
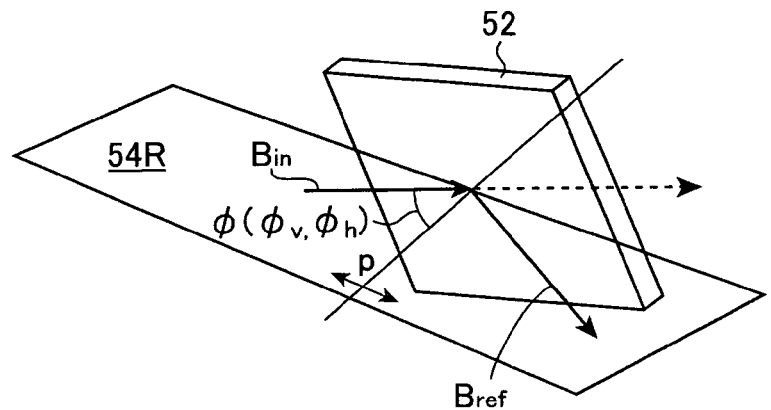
FIG. 6A, FIG. 6B, and FIG. 6C, each of which is an explanatory view showing the case where the p polarization plane does not become parallel to the vertical direction on the windshield glass of the vehicle when the azimuth of the scanning beam (laser light) is not zero (α≠0)
Figure 6B:
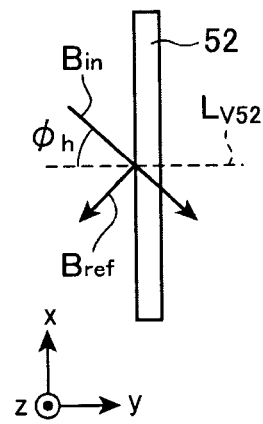
Figure 6C:
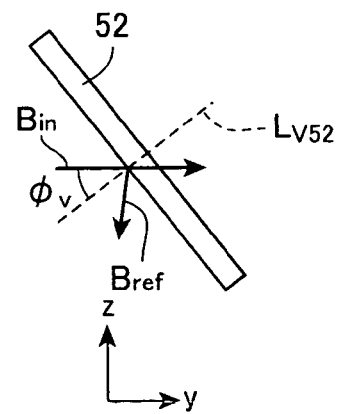

FIG. 6A, FIG. 6B, and FIG. 6C, each of which is an explanatory view showing the case where the p polarization plane does not become parallel to the vertical direction on the windshield glass 52 of the vehicle 50 when the azimuth of the scanning beam (laser light) is not zero ($\alpha \neq 0$). In particular, FIG. 6A is a perspective view of the scanning beam of laser light observed from the inside of the compartment of the vehicle 50. FIG. 6B is a plan view of the scanning beam of laser light observed from the upper side (the roof) of the vehicle 50. FIG. 6C is a side view of the scanning beam of laser light observed from the side of the vehicle 50. Similar to FIG. 5A, FIG. 5B, and FIG. 5C, the x direction, the y direction, and the z direction make a rectangular coordinate system, an orthogonal coordinate system, which are perpendicular with each other.

As shown in FIG. 4B, when the azimuth angle $\alpha$ of the scanning laser beam of laser light is not zero ($\alpha \neq 0$), the laser light is emitted toward an inclined front direction (R direction or L direction) of the vehicle 50.

A description will now be given of the case with reference to FIG. 6A, FIG. 6B, and FIG. 6C, where the azimuth angle $\alpha$ of the scanning beam of the laser light is 45° ($\alpha$=45°) and the laser light is irradiated to the side part of the R direction at the right side of the all scanning angle in the horizontal direction.

As shown in FIG. 6B, the incident laser light Bin and the normal line Lv52 intersect in the horizontal line with each other, and the incident angle $\phi h$ (horizontal component) of the laser light is not zero ($\phi h \neq 0$).

Further, as shown in FIG. 6C, the incident laser light Bin and the normal line Lv52 intersect in the vertical line with each other, and the incident angle $\phi v$ (vertical component) of the laser light is not zero ($\phi v \neq 0$).

Accordingly, as shown by the arrow solid and dotted lines in FIG. 6A, the polarization direction (or vibration direction) of the p polarized laser light is present within the incident surface 54R which includes the incident laser light Bin and the normal line Lv52. That is, the p polarization plane (incident surface 54R) rotates counter clockwise direction to the vertical direction (see FIG. 4A) observed from the inside of the compartment of the vehicle 50.

On the other hand, when the laser light is emitted toward the side of the L direction at the left hand of all scanning angle in the horizontal direction, the incident angle $\phi h$ (horizontal component) of the laser light is not zero ($\phi h \neq 0$), and the incident angle $\phi v$ (vertical component) of the laser light is not zero ($\phi v \neq 0$). In this case, the p polarization plane (incident surface 54L) rotates clockwise against the vertical direction when observed from the inside of the compartment of the vehicle 50.

Figure 7A:
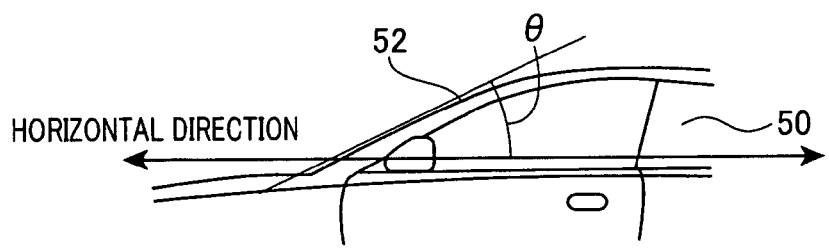
FIG. 7A is a view showing the definition of the angle θ of inclination of the windshield glass of the vehicle.
Figure 7B:
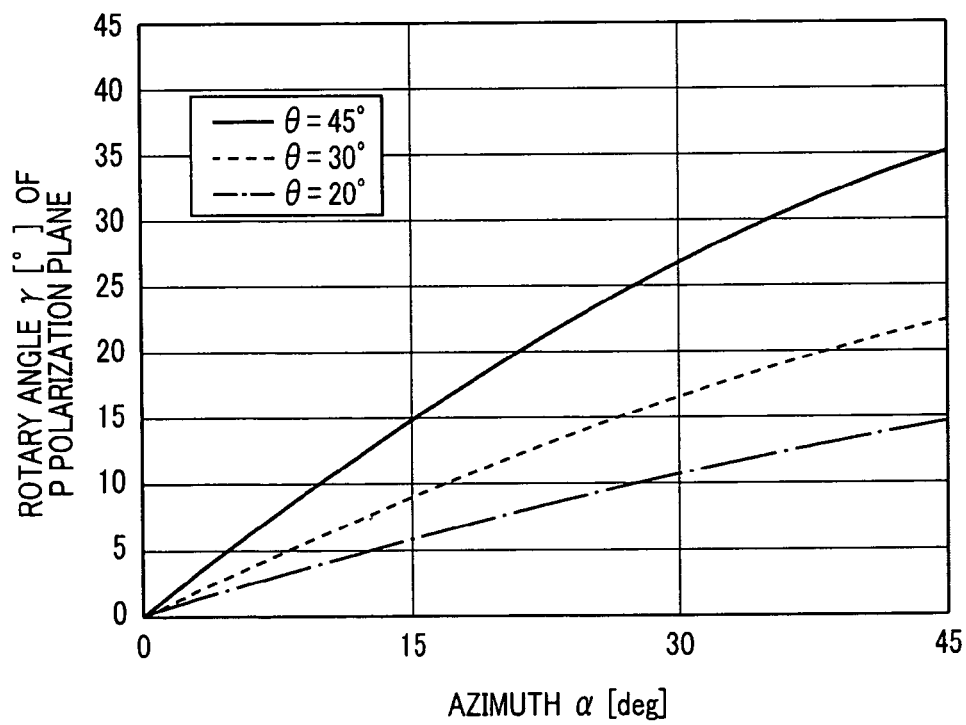
FIG. 7B is a graph showing a rotation angle γ of the p polarization plane to the azimuth angle α.

FIG. 7A is a view showing the definition of the angle $\theta$ of inclination of the windshield glass 52 of the vehicle 50. FIG. 7B is a graph showing a rotation angle $\gamma$ of the p polarization plane of the scanning beam of laser light against the azimuth angle $\alpha$.

In FIG. 7B, the horizontal axis indicates the azimuth $\alpha$ (°), and the vertical axis indicates the rotary angle $\gamma$ of the p polarization plane. The solid line indicates the angle $\theta$=45° of inclination of the windshield glass 52.

The dotted line indicates the angle $\theta$=30° of inclination of the windshield glass 52. The dash and dotted line designates the angle $\theta$=20° of inclination of the windshield glass 52.

As shown in FIG. 7A, the angle θ of inclination is the angle of the windshield glass 52 against the surface of the road (horizontal direction). In general, the windshield glass 52 of a vehicle has the angle θ=30° of inclination against the horizontal direction or the longitudinal direction of the vehicle.

As shown in FIG. 7B, the more the azimuth α is increased within the angle (or range) of 0 to 45°, the more the rotary angle γ of the p polarization plane is monotonically increased. For example, the rotary angle γ becomes zero (γ=0°) when the azimuth α is zero (α=0°) in case where the angle θ of inclination of the windshield glass 52 is 30° (θ=30°). On the other hand, the rotary angle γ becomes 22° (γ=22°) when the azimuth α is 45° (α=45°) in case where the angle θ of inclination of the windshield glass 52 is 30° (θ=30°).

In addition, the more the angle θ of inclination of the windshield glass 52 is increased such as 25°, 30°, 45°, the more the rotary angle γ of the p polarization plane is increased.

For example, the rotary angle γ becomes 9° (γ=9°) when the angle θ of inclination of the windshield glass 52 is 20° (θ=20°) in case where the azimuth α is 45° (α=54°).

On the other hand, the rotary angle γ becomes 35° (γ=35°) when the angle θ of inclination of the windshield glass 52 is 45° (θ=45°) in case where the azimuth α is 45° (α=54°).

<Decreasing Sensitivity by Reflection of Laser Light and Preventive Measure Against the Decreasing of Sensitivity>

A description will now be given of the reason for decreasing the sensitivity of the laser light at both sides of the visual zone of an on-vehicle laser radar device, and the preventive measure against the decreasing of the sensitivity.

Figures 8A, 8B, 8C:
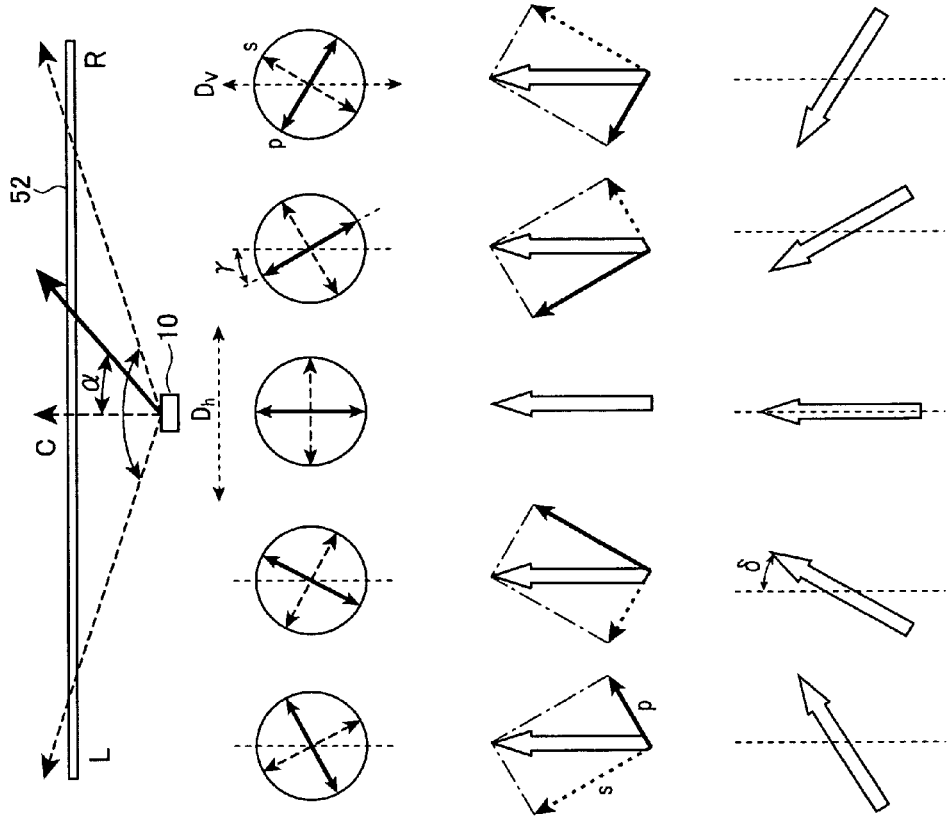
FIG. 8A, FIG. 8B, and FIG. 8C, each of which is an explanatory view showing a reason for decreasing the sensitivity at both sides of the visual zone and showing the method of preventing the sensitivity in the visual zone from decreasing.

FIG. 8A, FIG. 8B, and FIG. 8C, each of which is a view explanatory showing a reason for decreasing the sensitivity at both sides of the visual zone and showing the method of preventing the sensitivity in the visual zone from decreasing.

FIG. 8A shows the rotation of the p polarization plane according to the scanning azimuth. FIG. 8B shows the ratio of the p polarized component and the s polarized component when the polarized direction of the scanning beam of laser light becomes constant. In FIG. 8B, both the arrows of the solid lines represent the p polarization plane, and the arrows of the dotted lines indicate the s polarization plane. The outlined arrow indicates the polarized direction of the scanning beam of laser light.

FIG. 8C shows the case where the polarization plane of the scanning beam of laser light approximately coincides with the p polarization plane.

As shown in FIG. 8A, and as previously described, when the on-vehicle laser radar device 10 emits the laser light diagonally toward the front forward direction (C direction) of the horizontal direction of the vehicle 50, the p polarization plane becomes parallel o the vertical direction Dv.

On the other hand, when the on-vehicle laser radar device 10 emits the laser light diagonally toward the front forward direction (R direction or L direction) of the horizontal direction of the vehicle 50, the p polarization plane does not become parallel to the vertical direction Dv.

When the laser light is diagonally emitted toward the front right-side forward direction, the p polarization plane rotates counterclockwise against the vertical direction Dv. On the other hand, when the laser light is emitted diagonally toward the front left-side forward direction, the p polarization plane rotates clockwise against the vertical direction Dv.

As shown in FIG. 8B, when the polarized direction of the scanning beam of laser light is set to constant (parallel to the vertical direction Dv) in the entire scanning angle of the horizontal direction Dh, the ratio between the p polarized component and the s polarized component of the scanning beam of laser light is changed according to the rotation of the p polarization plane in the scanning azimuth.

The scanning beam of laser light emitted toward the C direction has only the p polarized component (that is, p polarization). On the other hand, the scanning beam of laser light emitted toward the R direction and the L direction has the p polarized component and the s polarized component.

The s polarized component of the scanning beam of laser light is increased toward both sides of the entire scanning angle as the scanning visual zone. As previously described, the reflection rate of the incident laser light becomes high when the s polarized component of the incident laser light is increased under the angle θ of inclination of the windshield glass 52 of the vehicle 50 and the detection sensitivity of the reflected laser light is decreased. In particular, the reflection rate of the p polarized component becomes approximately zero around the incident angle of φv=60°, and the detection rate caused by increasing the s polarized component is drastically increased.

As shown in FIG. 8C, in the on-vehicle laser radar device 10 according to the embodiment of the present invention, the polarization plane of the scanning beam of laser light is rotated by the angle δ so that the polarization plane of the scanning beam of laser light is approximately equal to the p polarization plane of the scanning beam of laser light. That is, it is controlled so that the rotary angle d of the polarization plane of the scanning beam of laser light in the scanning azimuth is approximately equal to the rotary angle γ of the p polarization plane of the scanning beam of laser light. It is thereby possible for the above control, which rotates the polarization plane by the angle δ according to the rotary angle γ of the p polarization plane of the scanning beam of laser light in the scanning azimuth, to decrease the reflection rate on the surface of the windshield glass 52 of the vehicle 50 in the scanning azimuth. It is further possible to increase the transmission rate of the scanning beam of laser light on the windshield glass 52.

As shown in FIG. 7B, the rotary angle γ of the p polarization plane of the scanning beam of laser light is changed according to the angle θ of inclination of the windshield glass 52 of the vehicle 50. More specifically, the on-vehicle laser radar device 10 according to the embodiment rotates the polarization plane of the scanning beam of laser light by the rotary angle δ on the basis of the rotary angle γ of the p polarization plane which is determined by the angle θ of inclination and the azimuth angle α. This makes it possible to increase the transmission rate of the scanning beam of laser light against the windshield glass 52 with angle θ of inclination and the azimuth angle α.

<Example of Light Polarization Unit>

A description will now be given of the structure of the light polarization unit 22 placed in the light output unit 12 shown in FIG. 1. The light polarization unit 22 rotates the polarization plane of the scanning beam of laser light, and scans the laser light while rotating the polarization plane of the scanning beam of laser light.

Figure 9A:
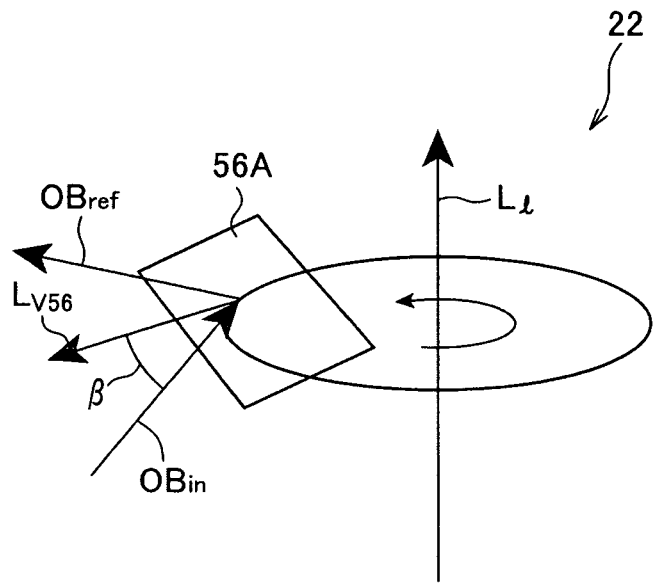
FIG. 9A and FIG. 9B are schematic views showing a structure of an optical polarizer capable of polarizing an incident laser light on a reflection surface of a rotary mirror of the optical polarizer.
Figure 9B:
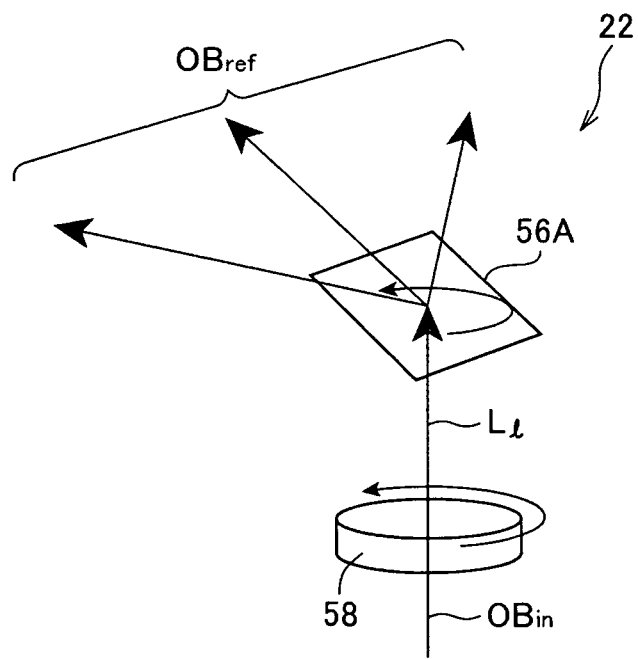

FIG. 9A and FIG. 9B are schematic views showing a structure of an optical polarizer capable of polarizing an incident laser light on a reflection surface of a rotary mirror of the optical polarizer as the light polarization unit 22. Each of the light polarization units 22 shown in FIG. 9A and FIG. 9B has a movable mirror 56.

In the example shown in FIG. 9A, the light polarization unit 22 is equipped with the movable mirror 56 which rotates around the rotary axis L1. FIG. 9A shows the reflection surface 56A side of the movable mirror 56. The movable mirror 56 is placed in the light polarization unit 22 so that the reflection surface 56A of the movable mirror 56 crosses the horizontal direction. The normal line of the reflection surface 56A of the movable mirror 56 is the normal line Lv56.

A description will now be given of the operation of the movable mirror 56 with reference to FIG. 9A, FIG. 9B in addition to FIG. 1, and FIG. 4A, and FIG. 4B.

The laser light (as the incident laser light OBin) emitted by the laser array light source 20 is reflected by the reflection surface 56A of the movable mirror 56. The laser light is polarized toward the horizontal direction by the variation of the surface azimuth of the reflection surface 56A of the movable mirror 56 on the basis of the rotation of the movable mirror 56.

The reflected laser light OBref is transmitted to the windshield glass 52. The incident angle β of the light polarization unit 22 is an angle made by the reflected laser light OBref and the normal line Lv56.

FIG. 9B shows the case where the reflected laser light OBref and the rotary axis L1 are intersected at right angles with each other. It is possible for them to cross with each other at a predetermined angle.

Figure 10A:
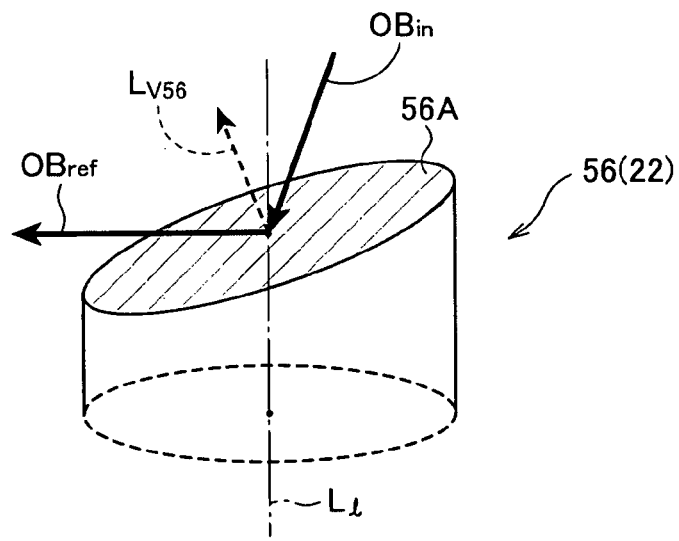
FIG. 10A and FIG. 10B, each of which shows a physical structure and action of the optical polarizer FIG. 11A and FIG. 11B, each of which shows the rotation of the polarization plane of the scanning beam.
Figure 10B:
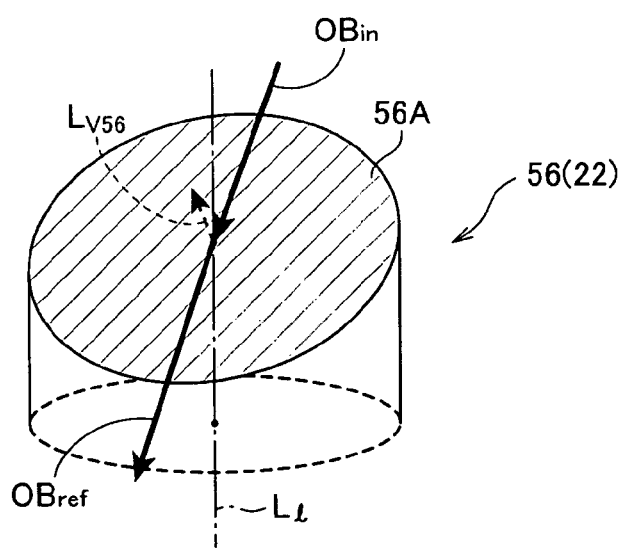

Each of FIG. 10A and FIG. 10B shows a physical structure and action of the optical polarizer. As shown in FIG. 10A and FIG. 10B, it is possible to form the light polarization unit 22 shown in FIG. 9A when the movable mirror 56 has a cylinder shape.

The reflection surface 56A is formed on the inclined plane when the movable mirror 56 having a cylinder shape is beveled. This inclined plane 56A of the inclined plane is designated by slant line in FIG. 10A and FIG. 10B. In the following explanation, it is supposed that the azimuth angle α of the scanning beam of laser light is changed by the rotation angle of the movable mirror 56.

As shown in FIG. 10A, at the rotary angle of zero (azimuth angle α=0°) of the rotary mirror 56, the reflected laser light OBref is input as the scanning beam into the central part of the windshield glass 52 of the vehicle 50.

As shown in FIG. 10B, at the rotary angle of 45° in clockwise direction (azimuth angle α=45°) of the rotary mirror 56, the reflected laser light OBref is input as the scanning beam into the left-side part of the windshield glass 52 of the vehicle 50.

Figure 11A:
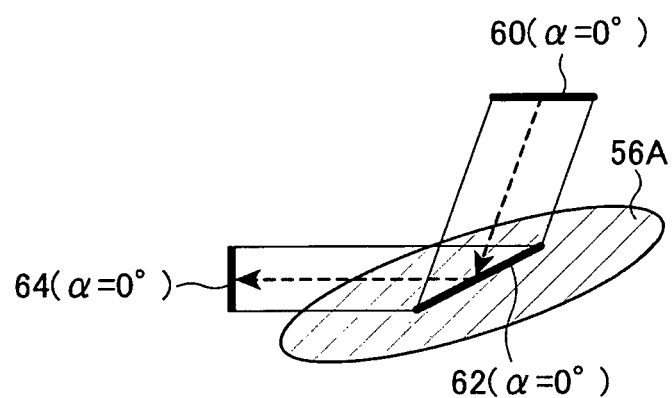
Figure 11B:
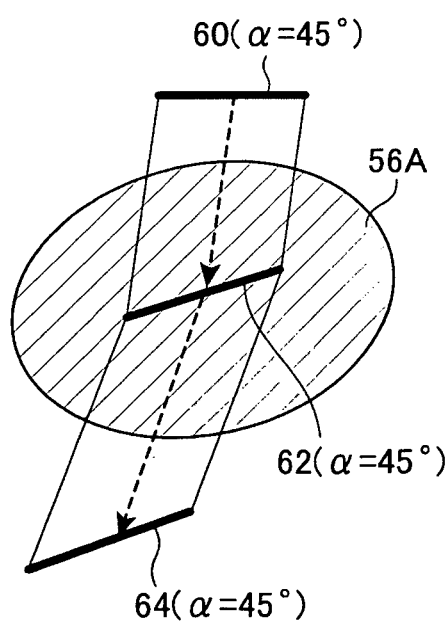

Each of FIG. 11A and FIG. 11B shows the rotation of the polarization plane of the scanning beam. As shown in FIG. 11A and FIG. 11B, the reflected laser light OBref is reflected at the reflection surface 56A of the movable mirror 56, and then input into the windshield glass 52 (omitted from FIG. 10A and FIG. 10B) of the vehicle 50.

FIG. 10A and FIG. 10B schematically show the relationship between the polarization plane 60 of the reflection laser light OBref, the image 62 on the reflection surface 56A, and the polarization plane 64 of the scanning beam of laser light which is projected onto the windshield glass 52 of the vehicle 50.

As shown in FIG. 11A, the image 62 on the reflection surface 56A is projected toward the front forward direction (C direction) when the azimuth angle α is zero (α=0°), and the polarization plane 64 of the scanning beam of laser light becomes parallel to the vertical direction.

In addition, as shown in FIG. 11B, the image 62 on the reflection surface 56A is projected diagonally toward the left forward direction (L direction) when the azimuth angle α is 45° (α=45°), and the polarization plane 64 of the scanning beam of laser light rotates clockwise from the vertical direction.

Figure 12:
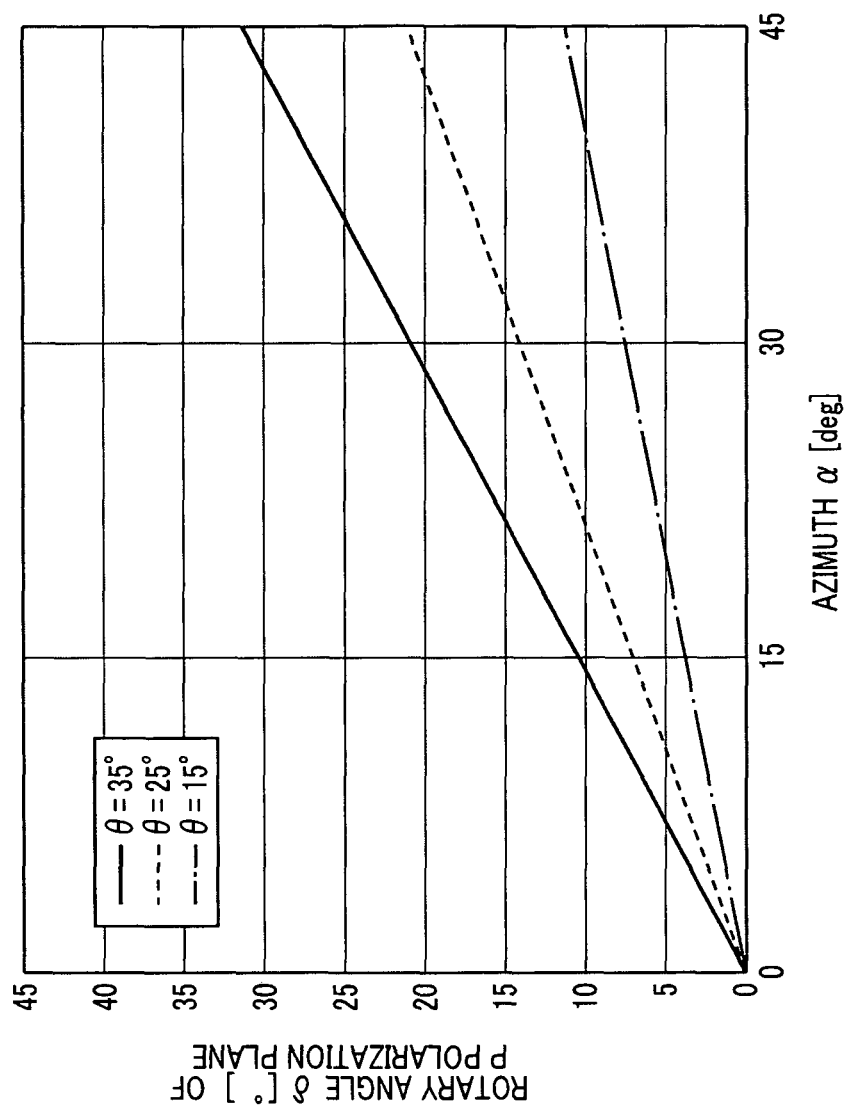
FIG. 12 is a graph showing the rotary angle δ of the polarization plane of the scanning beam of laser light.

FIG. 12 is a graph showing the rotary angle δ of the polarization plane of the scanning beam of laser light. In FIG. 12, the horizontal axis indicates the azimuth angle α (°), and the vertical axis represents the rotary angle δ of the polarization plane of the scanning beam of laser light.

In FIG. 12, the solid line indicates the case where the scanning beam of laser light is incident by the incident angle β of 35° (β=35°) on the reflection surface 56A of the rotary mirror 56. Further, the dotted line indicates the case where the scanning beam of laser light is incident by the incident angle β of 25° (β=25°) on the reflection surface 56A of the rotary mirror 56. The dash and dotted line designates the case where the scanning beam of laser light is incident by the incident angle β of 15° (β=15°) on the reflection surface 56A of the rotary mirror 56.

It is possible to change the rotary angle δ of the polarization plane of the scanning beam of laser light by changing the incident angle β to the reflection surface 56A of the rotary mirror 56.

That is, it is possible for rotary angle δ of the polarization plane of the scanning beam of laser light to have a predetermined angle by changing the azimuth angle α and the incident angle β. For example, when the azimuth angle α is 45° (α=45°), the rotary angle δ of the polarization plane of the scanning beam of laser light is 12° (δ=12°) when the incident angle β is 15° (β=15°). On the other hand, the rotary angle δ of the polarization plane of the scanning beam of laser light is increased up to 21° (δ=21°) when the incident angle β is 25° (β=25°), and the rotary angle δ of the polarization plane of the scanning beam of laser light is increased up to 32° (δ=32°) when the incident angle β is 35° (β=35°).

As shown in FIG. 7B, in case where the angle θ of inclination of the windshield glass 52 of the vehicle 50 is 30° (θ=30°), the rotary angle γ of the p polarization plane is 22° (γ=22°) when the azimuth angle α is 45° (α=45°). Accordingly, in case where the incident angle β of 25° (β=25°) on the reflection surface 56A of the rotary mirror 56 in the incident angle β of 25° (β=25°) on the reflection surface 56A of the rotary mirror 56 in the light polarization unit 22, the rotary angle δ of the polarization plane of the scanning beam of laser light is increased up to 21° (δ=21°) when the azimuth angle α is 45° (α=45°). This makes it for the polarization plane of the scanning beam of laser light to approximately coincide with the p polarization plane only within an error of ±10°.

The embodiment describe above shows the light polarization unit 22 having the structure shown in FIG. 9A. The present invention is not limited by the above structure of the light polarization unit 22 in which the scanning beam of laser light is scanned in the horizontal direction while rotating the polarization plane of the scanning beam of laser light. For example, it is possible for the light polarization unit 22 shown in FIG. 1 to have the structure shown in FIG. 9B.

The light polarization unit 22 shown in FIG. 9B has the rotary mirror which rotates around the rotary axis L1, like the example shown in FIG. 9A.

The light polarization unit 22 shown in FIG. 9B is equipped with the rotary mirror 56 and a ½ wave plate 58 which coaxially rotates with the rotary mirror 56. Like the structure shown in FIG. 9A, FIG. 9B schematically shows the reflection surface 56A as the rotary mirror. The rotary mirror 56 of the light polarization unit 22 is placed so that the reflection surface 56A of the rotary mirror 56 in the light polarization unit 22 and the horizontal direction cross with each other. The normal line of the reflection surface 56A is the normal line Lv56.

A description will now be given of the operation of the light polarization unit 22 shown in FIG. 9B with reference to FIG. 1, FIG. 4A, and FIG. 4B.

When the laser beam of laser light as the incident laser light OBin emitted from the laser array light source 20 is passed through the ½ wave plate 58, the polarization plane of the incident laser light OBin is rotated by the angle $\chi$. The incident laser light OBin is then reflected on the reflection surface 56A. The rotation angle of the ½ wave plate 58 necessary to rotate the polarization plane by the angle $\chi$ is $\alpha$.

The laser light as the incident laser light OBin is polarized in the horizontal direction by the change of the azimuth of the reflection surface 56A caused by the rotation of the rotary mirror 56, and the polarization plane of the laser light as the incident laser light OBin is further rotated. The reflected laser light OBref reflected on the reflection surface 56A of the rotary mirror 56 is projected on the windshield glass 52 of the vehicle 50.

As can be understood from the operation described above, the light polarization unit 22 shown in FIG. 9B rotates the polarization plane 64 of the scanning beam of laser light as the incident laser light OBin by the rotary mirror 56 and the ½ wave plate 58 which are coupled in operation. That is, it is possible to adjust the rotation angle $\delta$ of the polarization plane 64 of the scanning beam of laser light by changing the rotation angle $\rho$, the azimuth angle $\alpha$, the incident angle $\beta$ of the ½ wave plate 58.

In the structure shown in FIG. 9B, the ½ wave plate 58 is placed at the upstream side of the rotary mirror 56. It is also possible to place the ½ wave plate 58 at the downstream side of the rotary mirror 56. It is also possible to replace the ½ wave plate 58 with two ¼ wave plates.

<Field of Application>

The above embodiment applies the concept of the present invention to the on-vehicle laser radar device. The present invention is not limited by the above embodiment.

In general, a light scanning device for scanning laser light through a transparent plate which is placed with an angle of inclination causes a problem for decreasing the detection sensitivity at both sides of a wide-angle visual zone as the scanning zone of the beam of laser light. Therefore, it is possible to adequately apply the concept of the present invention to light scanning devices and laser radar devices for scanning laser light through a transparent plate which is placed with a predetermined angle of inclination. Those cases can obtain the same effects of the embodiment previously described.

For example, the on-vehicle laser radar device according to the present invention can be applied to aircrafts, trains, ships, etc. It is also possible to mount the on-vehicle laser radar device according to the present invention on the device which is fixed to the ground and does not move. In particular, the on-vehicle laser radar device according to the present invention can be preferably applied to the case where a penetrate plate is placed with the angle of inclination within the angle (or range) of not less than 20° and not more than 45°. This makes it possible to efficiently prevent the sensitivity from decreasing.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A light scanning device comprising:
   a transparent plate extending across a horizontal direction with a predetermined angle of inclination; and
   a light output unit, equipped with a light source and a light polarization unit, and being configured to scan a laser light toward an outside of the light scanning device in a horizontal direction through the transparent plate,
   wherein the light source generates and emits laser light, and the light polarization unit polarizes the laser light emitted from the light source, and
   the light output unit is further configured to instruct the light polarization unit to rotate a polarization plane of the laser light on the basis of a predetermined angle of inclination of the transparent plate and an azimuth angle in the horizontal direction, where the azimuth angle in the horizontal direction is an angle obtained between an azimuth of the laser light in the horizontal direction and a reference azimuth of the transparent plate, and to output a rotated laser light to the transparent plate in order to scan the rotated laser light to the outside of the light scanning device through the transparent plate.

2. The light scanning device according to claim 1, wherein the light polarization unit rotates the polarization plane of laser light emitted from the light source so that the polarization plane of the laser light is approximately equal to the direction of the p polarization plane of the laser light which is determined on the basis of the angle of inclination and the azimuth angle of the horizontal direction.

3. The light scanning device according to claim 1, wherein the light polarization unit has a movable mirror with a reflection surface which extends across the horizontal direction so that an incident laser light emitted from the light source is reflected toward the horizontal direction, and the incident laser light emitted from the light source is polarized by rotating the movable mirror around a predetermined axis.

4. The light scanning device according to claim 3, wherein the movable mirror rotates the polarization plane of the laser light on the basis of the incident angle to the reflection surface of the incident laser light.

5. The light scanning device according to claim 3, wherein the light polarization unit further has a ½ wave plate which rotates coaxially with the movable mirror, and the light polarization unit rotates the polarization plane of the laser light according to the incident angle of the incident laser light to the reflection surface and the rotation angle of the ½ wave plate.

6. The light scanning device according to claim 1, wherein the angle of inclination of the transparent plate is not less than 20° and not more than 45°.

7. A laser radar device for scanning laser light, comprising:
   a windshield glass which is extending across a horizontal direction with a predetermined angle of inclination to the horizontal direction; and
   a light output unit equipped with a light source for emitting laser light and a light polarization unit for polarizing the laser light, and the light output unit being configured to scan the laser light emitted by the light source in the horizontal direction and to instruct the light polarization unit to rotate a polarization plane of the laser light emitted from the light source on the basis of the angle of inclination of the windshield glass and an azimuth angle in the horizontal direction where the azimuth angle in the horizontal direction is an angle obtained between an azimuth of the laser light in the horizontal direction and a reference azimuth of a transparent plate, the light output unit being further configured to output a polarized laser light to the windshield glass in order to scan the polarized laser light toward the outside of the laser radar device; and
   a light detection unit being configured to detect the laser light which is scanned by the light output unit through the transparent plate and then reflected by an obstacle placed in a scanning visual zone including front visual zone and side visual zones.

8. The laser radar device according to claim 7, wherein the light polarization unit rotates the polarization plane of laser light emitted from the light source so that the polarization plane of the laser light is approximately equal to the direction of the p polarization plane of the laser light which is determined on the basis of the angle of inclination and the azimuth angle of the horizontal direction.

9. The laser radar device according to claim 7, wherein the light polarization unit has a movable mirror with a reflection surface which extends across the horizontal direction so that the incident laser light emitted from the light source is reflected toward the horizontal direction, and the incident laser light emitted from the light source is polarized by rotating the movable mirror around a predetermined axis.

10. The laser radar device according to claim 7, wherein the angle of inclination of the windshield glass is not less than 20° and not more than 45°.

11. A method of scanning laser light through a transparent plate which is placed with a predetermined angle of inclination to a horizontal direction, comprising steps of:
scanning laser light emitted from a light source,
rotating a polarization plane of the laser light on the basis of the angle of inclination of the transparent plate and an azimuth angle in the horizontal direction, where the azimuth angle in the horizontal direction is an angle obtained between an azimuth of the laser light in the horizontal direction and a reference azimuth of the transparent plate;
outputting a polarized laser light to the transparent plate, and
scanning the polarized laser light through the transparent plate.

12. The method of scanning laser light according to claim 11, wherein the polarization plane of laser light emitted from the light source is rotated so that the polarization plane of the laser light is approximately equal to the direction of the p polarization plane of the laser light which is determined on the basis of the angle of inclination and the azimuth angle of the horizontal direction.

13. The method of scanning laser light according to claim 11, wherein the laser light emitted by the light source is polarized by rotating a movable mirror with a reflection surface which extends across with the horizontal direction around a predetermined axis so that an incident light of the laser light emitted from the light source is reflected toward the horizontal direction.

14. The method of scanning laser light according to claim 11, wherein the angle of inclination of the transparent plate is placed with the angle of inclination within an angle of not less than 20° and not more than 45°.

* * * * *